United States Patent [19]
Kiapos

[11] Patent Number: 5,414,907
[45] Date of Patent: May 16, 1995

[54] EYEGLASS RETAINER COUPLING AND METHOD FOR ATTCHING BEAD CHAIN TO RETAINER

[76] Inventor: John Kiapos, 9161 La Tuna Canyon Dr., Sun Valley, Calif. 91352

[21] Appl. No.: 743,170
[22] Filed: Aug. 9, 1991
[51] Int. Cl.⁶ .................................... A44B 21/00
[52] U.S. Cl. ................................ 24/3.3; 24/116 A
[58] Field of Search ............... 24/3 C, 3 G, 3 B, 3 M, 24/116 A, 299, 300, 301, 302

[56] References Cited

U.S. PATENT DOCUMENTS

| | | | |
|---|---|---|---|
| 2,036,172 | 3/1936 | Gagnon | 24/116 A |
| 2,835,945 | 5/1968 | Hilsinger | 24/300 X |
| 3,827,790 | 8/1974 | Wenzel | 24/36 X |
| 3,979,795 | 9/1976 | Seron | 24/289 X |
| 4,695,913 | 10/1990 | Sugarman | 24/301 X |

*Primary Examiner*—James R. Brittain
*Attorney, Agent, or Firm*—Beehler & Pavitt

[57] ABSTRACT

An eyeglass retainer is formed by a bead chain each end of which is attached to a temple of the eyeglasses by a coupling which comprises a pair of trough-like members flexibly attached to a cup-like receptacle which receives the end of the bead chain. The trough-like members encompass a portion of a stretchable plastic hook and are held together by a sleeve. The temple is passed through the remainder of the loop which is cinched back by a helical spring to secure the temple within the loop. The stretchability of the plastic loop enables it to pass through both the sleeve and helical spring.

3 Claims, 2 Drawing Sheets

U.S. Patent May 16, 1995 Sheet 1 of 2 5,414,907
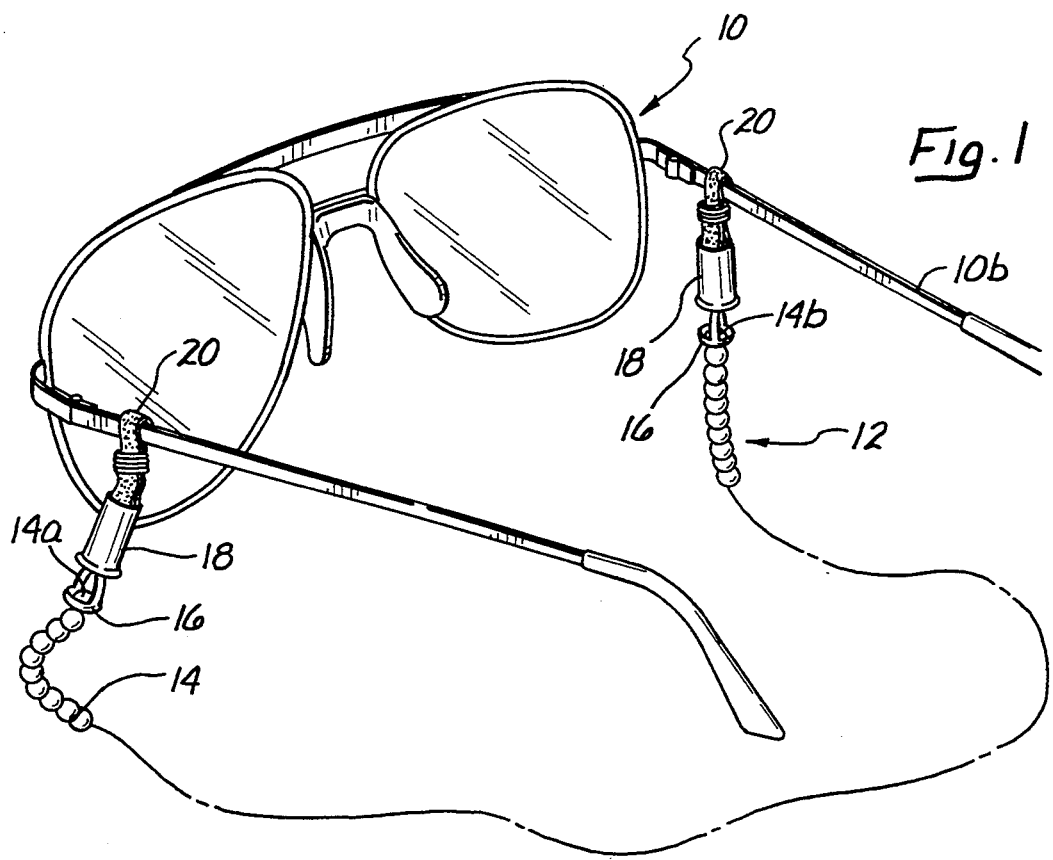
Fig. 1
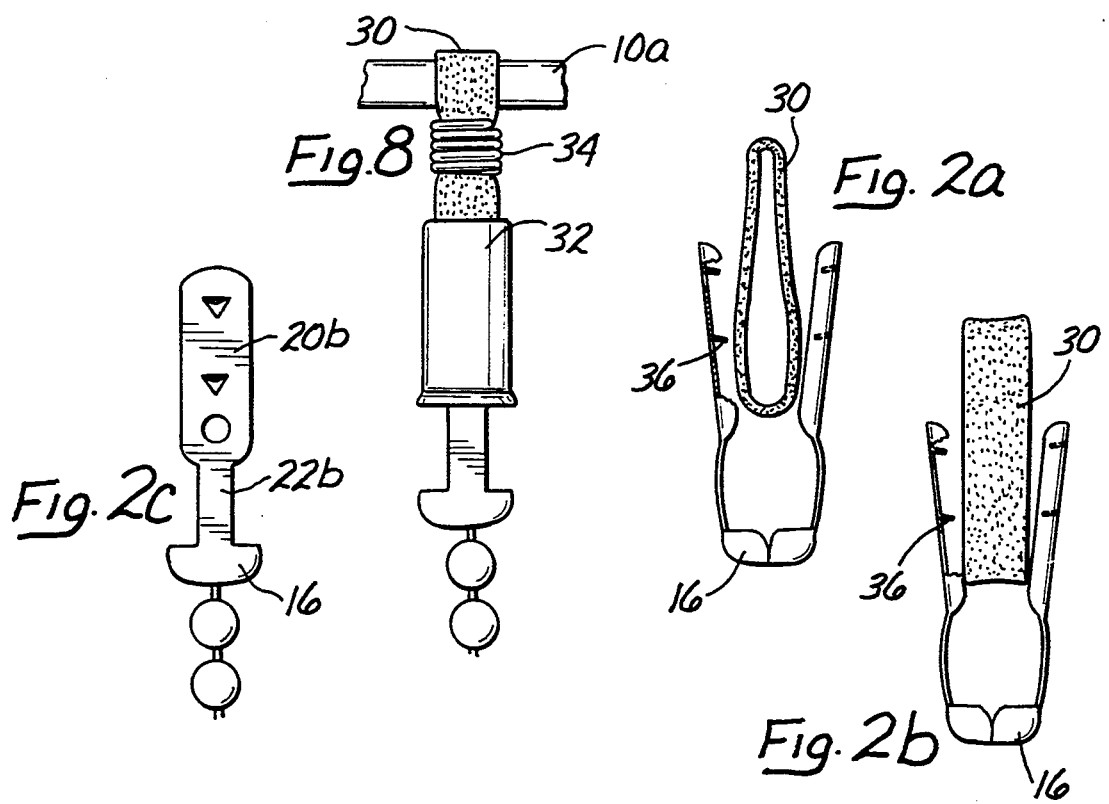
Fig. 8
Fig. 2a
Fig. 2c
Fig. 2b

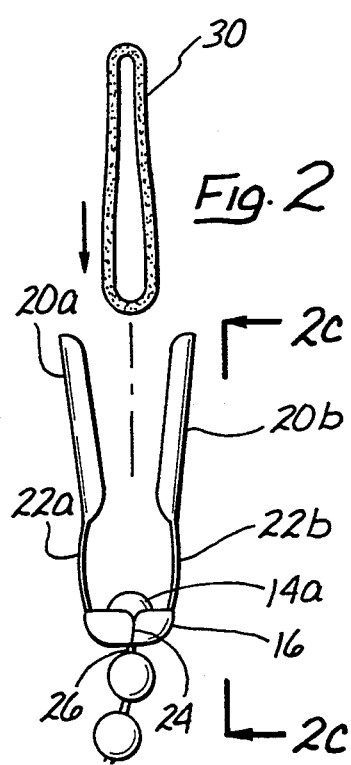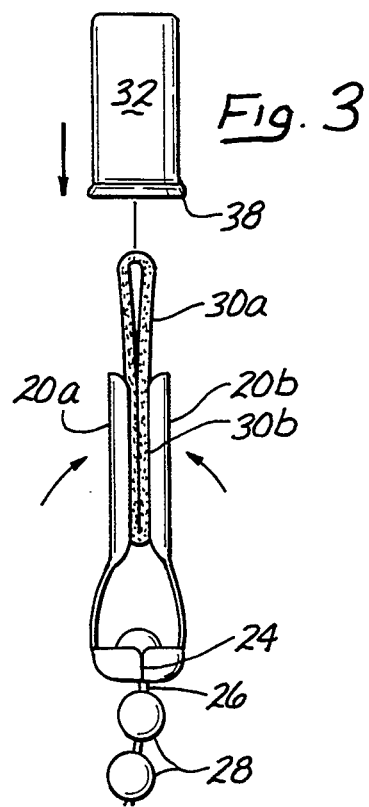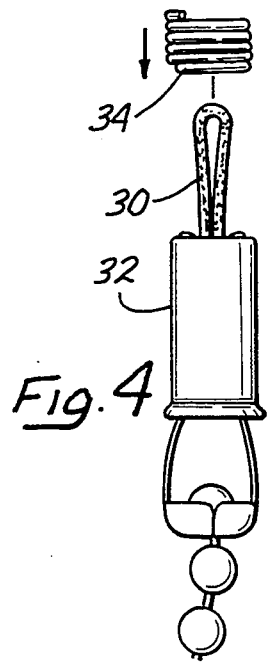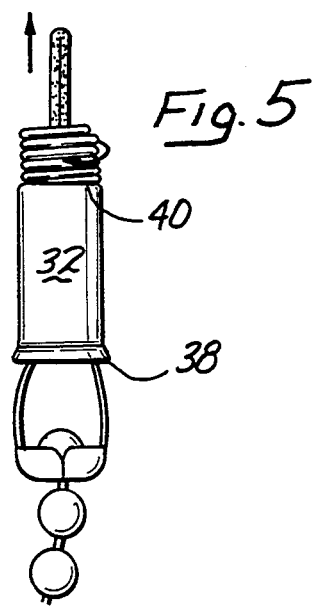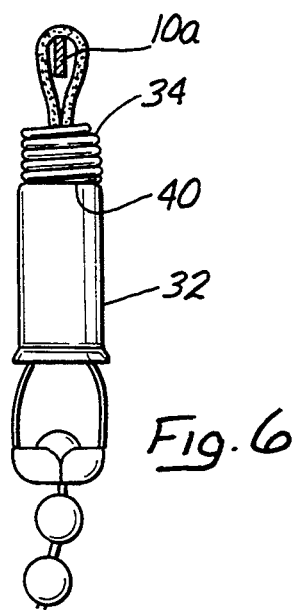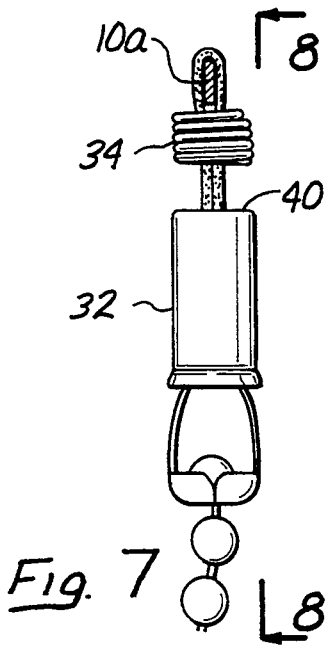

EYEGLASS RETAINER COUPLING AND METHOD FOR ATTCHING BEAD CHAIN TO RETAINER

FIELD OF THE INVENTION

This invention relates to the field of element couplings with particular application to couplings for lengths of decorated bead chain utilized as eyeglass retainers to prevent pairs of eyeglasses from falling off the heads of the wearers.

BACKGROUND OF THE INVENTION

Description of the Prior Art

Bead chains, either decorative or functional, or both, have been utilized for various purposes for more than fifty years. U.S. Pat. No. 2,036,172 issued to Bernard E. Gagnon on Mar. 31, 1936, illustrates and describes a coupling whereby the end of a bead chain may be removably attached to the end of an elongated flexible cord member. While a bead chain coupled to a cord in the manner thus illustrated and described, may have many applications and uses, it does not appear to be readily adaptable for an eyeglass retainer of the type contemplated by the present inventor without making some special modification of the cord member to provide a loop to which the temple of a pair eyeglasses, or some other transverse rigid elongated element may be inserted. Even if a suitable cord of the type shown in the Gagnon patent were to be used, it would appear that once it is installed in the coupling, it could easily be uncoupled if the cord were too long; or incapable of being uncoupled, if the cord were too short. If the cord loop should be too large, the temple of the eyeglasses could slide out.

Since it has now become practical to color bead chains, through the method recently patented to the present inventor by U.S. Pat. No. 4,988,542, and multi-colored bead chains thus produceable have become quite popular for many applications, including as eyeglass retainers, providing a suitable coupling to enable colored bead chains to be thus employed has become most commercially desirable. However, such desired object has not been practically attainable with the coupling of the prior art.

SUMMARY OF THE PRESENT INVENTION

The present invention utilizes the basic coupling components of the above-mentioned Gagnon patent insofar as securing one end of a bead chain, but substitutes for the cord a novel stretchable closed plastic loop, a portion of which is pinched together and inserted first through the tube and then between the coupling troughs or jaws for clamping between them. When so clamped, the loop portion is secured in its clamped position by sliding the tube back over the outside of the trough members to effect a relatively tight fit. A helical spring is then twisted over the remaining portion of the stretchable loop, initially down to where it abuts the tube. The spring is so disposed by pulling the remaining portion of the plastic loop to stretch it to reduce its cross-section to where it can be passed through the helical coil. However, when the pulling is discontinued, the remaining portion of the plastic loop regains its normal size to present a cross section which is greater than the inside diameter of the helical spring and thus, will not pass through the latter. What remains then is a portion of the plastic loop through which a rigid element, such as an eyeglass temple, may be passed. After the rigid element is so passed through the remaining portion of the loop, the loop forming plastic is again pulled to stretch it to where the spring may be twisted back to decrease the size of the remaining loop and thus cinch it around the rigid element.

DESCRIPTION OF THE DRAWINGS

In the accompanying drawings,

FIG. 1 is a perspective of a pair of glasses with an eyeglass retainer incorporating couplings of the present invention.

FIG. 2 is a enlarged exploded view of the loop and clamping portion of the assembly.

FIG. 2a is an elevation similar to FIG. 2 showing the manner in which the loop is brought into the clamping jaws.

FIG. 2b is a view similar to FIG. 2a but showing the plastic loop turned 90 degrees.

FIG. 2c is a view of the clamping portion of the assembly taken in the direction of the arrows on FIG. 2.

FIG. 3 is an elevation similar to that of FIG. 2, but showing the jaws closed over the loop and the tubular sleeve element in position for movement over the loop and clamping jaws.

FIG. 4 is an elevation similar to that of FIG. 3 but showing the tubular sleeve element slipped over the clamping jaws and the coil spring retainer in position for movement over the loop.

FIG. 5 shows the spring retainer positioned over the loop and against one end of the tubular member.

FIG. 6 is similar to FIG. 5, but shows the insertion of an eyeglass temple in the loop.

FIG. 7 shows the spring moved back from the tube to cinch the loop about the eyeglass temple.

FIG. 8 is view taken in the, direction of the arrows on FIG 7.

DESCRIPTION OF THE PREFERRED EMBODIMENT

Referring to FIG. 1 of the drawings, a pair of eyeglasses 10 is provided with a retainer 12 which is secured on each of the eyeglass temples 10a, 10b.

The retainer 12 in the embodiment shown is a decorative bead chain 14, each end 14a, 14b of which is held in a cup-like element 16 which comprises one end of the coupling assembly 18. The other end 20 of the assembly is attached to a temple 10a or 10b of the eyeglasses 10.

The components of the coupling assembly 18 and the manner in which they are assembled may be understood from a consideration of FIGS. 2–8, inclusive, of the drawings: starting with FIG. 2, a pair of trough-like members 20a and 20b are connected by a pair of flexible elements 22a, 22b, respectively to the cup-like element 16. The latter may be generally hemispherical in shape with a slot 24 of a width just sufficient to allow the cord 26 which connects the beads 28 to form the bead chain 12.

The coupling 18 additionally comprises a stretchable plastic closed loop 30, a tubular sleeve 32, and a helical spring 34. The inside diameter of the sleeve 32 desirably should provide a close fit over the trough-like members 20a and 20b when they are closed to encompass a portion 30b of the loop 30 as shown in FIG. 3.

The inside diameter of the helical spring 34 should be such as to fit tightly about a pinched portion 30a of the loop 30 when the portion 30a is not stretched by a pulling force.

The inner faces of each of the members 20a, 20b desirably may be arcuate and have extending radially inwardly at least one projection 36, the function of which will later be explained.

To assemble the coupling, the end bead 14a or 14b of a bead chain 14 is placed in a cup 16 and its cord 26 is forced through the slot 24 to where it is effectively secured in the bottom of the cup. The closed stretchable plastic loop 30 is then brought partially between the jaws formed by the trough-like elements 20a, 20b which are then clamped over the pinched portion 30b of the loop 30 as shown in FIG. 3. When this clamping occurs, the projection or projections 36 may either pierce the pinched portions 30b of the plastic which defines the loop, or pass between those portions 30b, depending upon whether the plastic is oriented normally to the projections 36 or parallel to them. The tubular sleeve 32 is then slipped over both the unclamped remainder 30a of the loop 30, as well as the outside walls of the trough-like members 20a, 20b to the position shown in FIG. 4. In this connection, it should be pointed out that the leading edge 38 of the sleeve 32 should be flared so as not to intersect and cut the flexible connecting elements 22a, 22b.

At this point in the assembly process the remaining portion 30a of the stretchable plastic loop 30 should be pulled to decrease its cross section so that the helical spring 34 may be forced over it to position the spring 34 against the trailing edge 40 of the sleeve 32, as best shown in FIG. 5. The remaining portion 30a of the loop 30 is then opened to pass through it one of the temples 10a or 10b as illustrated in FIG. 6, following which the remaining portion 30a of the loop 30 is stretched to enable the helical spring 34 to be moved axially away from the trailing edge 40 of the sleeve 32 to shorten the remaining loop portion 30a and cinch it tightly against the temple 10a as shown in FIGS. 7 and 8.

When the pull on the remaining portion 30a of the loop 30 is released, the stretchable plastic of which it is composed immediately returns to its original thickness and configuration, thereby preventing any movement of the helical spring 34 axially back toward the sleeve 32 which would result in uncinching the remaining portion 30a of the loop 30 about the temple 10a.

From the foregoing, it may be seen that the coupling of the present invention may be easily assembled from several readily available components, and particularly enables decorative bead chains to be utilized as eyeglass retainers.

I claim:

1. A coupling to attach one end of an elongated bead chain to a transverse rigid elongated element, such as the temple of a pair of glasses, said coupling comprising:
   a pair of oppositely facing trough-shaped portions of equal length having inner walls and first and second ends, and being disposed about a common axis, the inner wall of at least one of said trough-shaped portions having a projection directed radially inwardly toward the common axis;
   a cup member, said cup member being disposed coaxially with said common axis and with the mouth of the cup facing, but spaced from, the first ends of said trough shaped portions, said cup member having a slot in a portion of its cup defining wall, and the rim of the cup being connected to the first ends of the trough-shaped portions by a pair of thin flexible elements spaced oppositely apart from each other, whereby the the trough-shaped portions may be moved between an open position at least at their second ends and a closed position parallel to each other and encompassing the common axis;
   a stretchable plastic closed loop, a portion of said loop being pinched together and inserted between the trough portions and engaged by said projection, and the remaining portion of said loop also being largely pinched together and extending axially beyond said second ends of the trough portions;
   a tubular member the last said member having first and second ends, the tubular member being slipped over the remaining portion of said loop and the second ends of the trough portions to encompass the trough portions and pass the remaining portion of the loop through the tubular member; and
   a helical spring, said spring being disposed on said remaining portion of the loop to minimize the excess area of such remaining portion of the loop beyond what is required to encompass the rigid elongated element passed therethrough.

2. The coupling as described in claim 1 wherein a projection extends radially inwardly toward the common axis from the inner wall of each trough-shaped portion.

3. The method of assembling a coupling as described in claim 1 which comprises:
   placing an end of the bead chain in the slot in the cup wall;
   pinching a portion of the stretchable plastic and inserting said pinched portion between the trough portions;
   clamping the trough shaped portions over the pinched portion of the loop to engage the projection therewith;
   sliding the tubular member over and by the remaining unclamped portion of the loop and over the trough-shaped portions to encompass the last said portions;
   pinching the said remaining unclamped portion of the loop tightly and pulling it away from the tubular member to stretch the last said portion and minimize its cross section;
   twisting the helical spring over said remaining unclamped portion to advance it toward the second end of the tube;
   releasing the pull on said remaining portion of the loop to open the latter;
   passing the rigid element through the thus opened remaining portion of the loop;
   further pulling the remaining portion of the loop to again decrease the cross-section;
   sliding the spring back from the second end of the tube to cinch the remaining portion tightly about the rigid element; and
   releasing the pull on the loop.

* * * * *